(12) United States Patent
Liao

(10) Patent No.: US 6,330,139 B1
(45) Date of Patent: Dec. 11, 2001

(54) I/O BRACKET OF ELECTRONIC DEVICE

(75) Inventor: Nien Chiang Liao, Lu-Chu (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/442,364

(22) Filed: Nov. 17, 1999

(30) Foreign Application Priority Data

Jun. 3, 1999 (TW) .................................. 8820951 U

(51) Int. Cl.$^7$ ............... G06F 1/16; H05K 9/00; H05K 1/14
(52) U.S. Cl. ............... 361/86; 439/61; 361/816; 174/35 R; 174/35 GC
(58) Field of Search ................. 361/679–686, 361/724–727, 816, 818, 752; 174/35, 35 R, 35 GC; 439/61

(56) References Cited

U.S. PATENT DOCUMENTS

| | | | |
|---|---|---|---|
| 5,347,430 | * | 9/1994 | Curlee et al. ........................ 361/752 |
| 5,564,930 | * | 10/1996 | Yu .......................................... 439/61 |
| 5,684,271 | * | 11/1997 | Scholder et al. .................... 174/35 R |
| 5,742,003 | * | 4/1998 | Ho ....................................... 174/35 R |
| 5,785,533 | * | 7/1998 | Baitz et al. ............................ 439/61 |
| 5,822,182 | * | 10/1998 | Scholder et al. ..................... 361/683 |
| 5,934,775 | * | 8/1999 | Ho ...................................... 312/223.2 |
| 6,023,415 | * | 2/2000 | Mayer et al. ......................... 361/816 |
| 6,055,152 | * | 4/2000 | Felcman et al. ..................... 361/683 |
| 6,166,325 | * | 12/2000 | Wu .................................... 174/35 GC |
| 6,239,358 | * | 5/2001 | Chang ................................. 174/35 R |

* cited by examiner

Primary Examiner—Gerald Tolin
Assistant Examiner—Lea Edmonds
(74) Attorney, Agent, or Firm—Wei Te Chung

(57) ABSTRACT

An I/O bracket is mounted to a back panel of an enclosure defining connector access openings for exposing connectors mounted in the enclosure. The back panel defines a substantially rectangular opening having a circumferential wall perpendicular thereto. The bracket includes a plate having a primary flange perpendicular thereto for movably fitting over the wall of the back panel. A second flange perpendicularly extends from the primary flange and defines a plurality of trapezoidal holes having a wide end and a narrow end. L-shaped pawls are stamped on the back panel for being received in the wide ends of the holes when the bracket is at a first unlocked position and engaging with the narrow ends of the holes when the bracket is moved with respect to the back panel to a second locked position and thus securing the bracket to the back panel. An extension is formed on a lateral edge of the bracket whereby when the bracket is moved to the second position, an additional part of the enclosure is mounted to the enclosure at a position abutting against the extension thereby preventing the bracket from moving back to the first position. Tabs are formed on an opposite lateral edge of the bracket for engaging with slots defined in the back panel when the bracket is moved from the first position to the second position for attaching the bracket to the back panel.

20 Claims, 5 Drawing Sheets

I/O BRACKET OF ELECTRONIC DEVICE

BACKGROUND OF THE INVENTION

1. Field of the Invention

The present invention generally relates to an I/O (input/output) bracket of an electronic device, and in particular to an I/O bracket capable to be readily mounted to an enclosure of the electronic device without use of fasteners, such as bolts and rivets.

2. The Prior Art

An electronic device, especially an information appliance, such as a personal computer, a printer, a video compact disk (VCD) player, and a network computer, requires data exchange with other information processing devices. To receive and transmit data, I/O connectors are provided in an information appliance or data processing device for connection with other devices. For access of the I/O connectors, openings are defined in an enclosure of the information appliance corresponding to the connectors thereby exposing the connectors.

Taking personal computer as an example, a conventional computer enclosure forms a number of elongate slots in a back panel thereof with seal plates attached thereto by bolts. I/O connectors may be selectively mounted to the seal plates thereby exposed through the corresponding slots of the back panel. Examples are disclosed in Taiwan Patent Application Nos. 78210118 and 84209619.

Taiwan Patent Application No. 84203698 discloses a computer enclosure having a back panel defining two large openings. A covering plate defining a plurality of slots is attached to the back panel for closing the openings. Seal plates to which I/O connectors are selectively mounted are attached to the back panel to seal the slots. Bolts are required to secure the covering plate to the back panel and to fix the seal plates to the covering plate.

Other examples of mounting I/O connectors to an enclosure are disclosed in U.S. Pat. Nos. 4,873,395, 5,004,867 and 5,564,930 and Taiwan Patent Application No. 84210160. All the conventional techniques for mounting I/O connectors to an enclosure require use of bolts or the likes. Tightening/loosening bolts is a time-consuming and laborious job that may influence overall manufacturing efficiency of the related electronic devices.

It is thus desired to provide an I/O bracket allowing ready mounting to an enclosure for overcoming the problem discussed above.

SUMMARY OF THE INVENTION

Accordingly, an object of the present invention is to provide an I/O bracket of an electronic device that is capable to be mounted to an enclosure of the electronic device without using bolts, rivets or similar fasteners.

Another object of the present invention is to provide an I/O bracket of an electronic device that is capable to be readily mounted to an enclosure of the electronic device.

To achieve the above objects, an I/O bracket in accordance with the present invention comprises defines connector access openings and is to be mounted to a back panel of an enclosure for exposing connectors mounted in the enclosure. The back panel defines a substantially rectangular opening having a circumferential wall perpendicular thereto. The bracket includes a plate having a primary flange perpendicular thereto for movably fitting over the wall of the back panel. A second flange perpendicularly extends from the primary flange and defines a plurality of trapezoidal holes having a wide end and a narrow end. L-shaped pawls are stamped on the back panel for being received in the wide ends of the holes when the bracket is at a first unlocked position and engaging with the narrow ends of the holes when the bracket is moved with respect to the back panel to a second locked position and thus securing the bracket to the back panel. Pin extension is formed on a lateral edge of the bracket whereby when the bracket is moved to the second position, an additional part of the enclosure is mounted to the enclosure at a position abutting against the extension thereby preventing the bracket from moving back to the first position. Tabs are formed on an opposite lateral edge of the bracket for engaging with slots defined in the back panel when the bracket is moved from the first position to the second position for attaching the bracket to the back panel.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
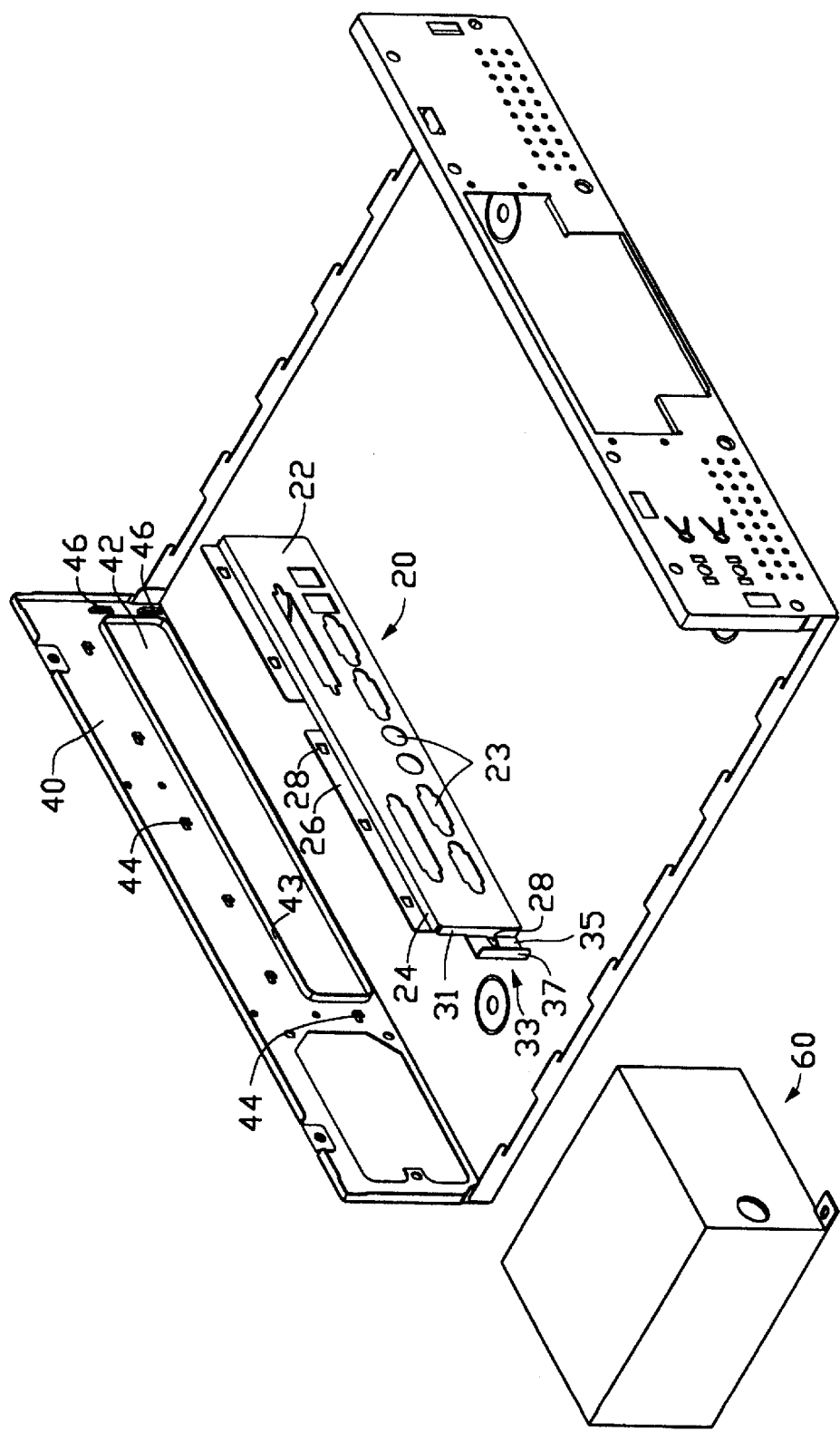
FIG. 1 is a perspective view of a computer enclosure to which an I/O bracket constructed in accordance with the present invention is to be mounted.
Figure 2:
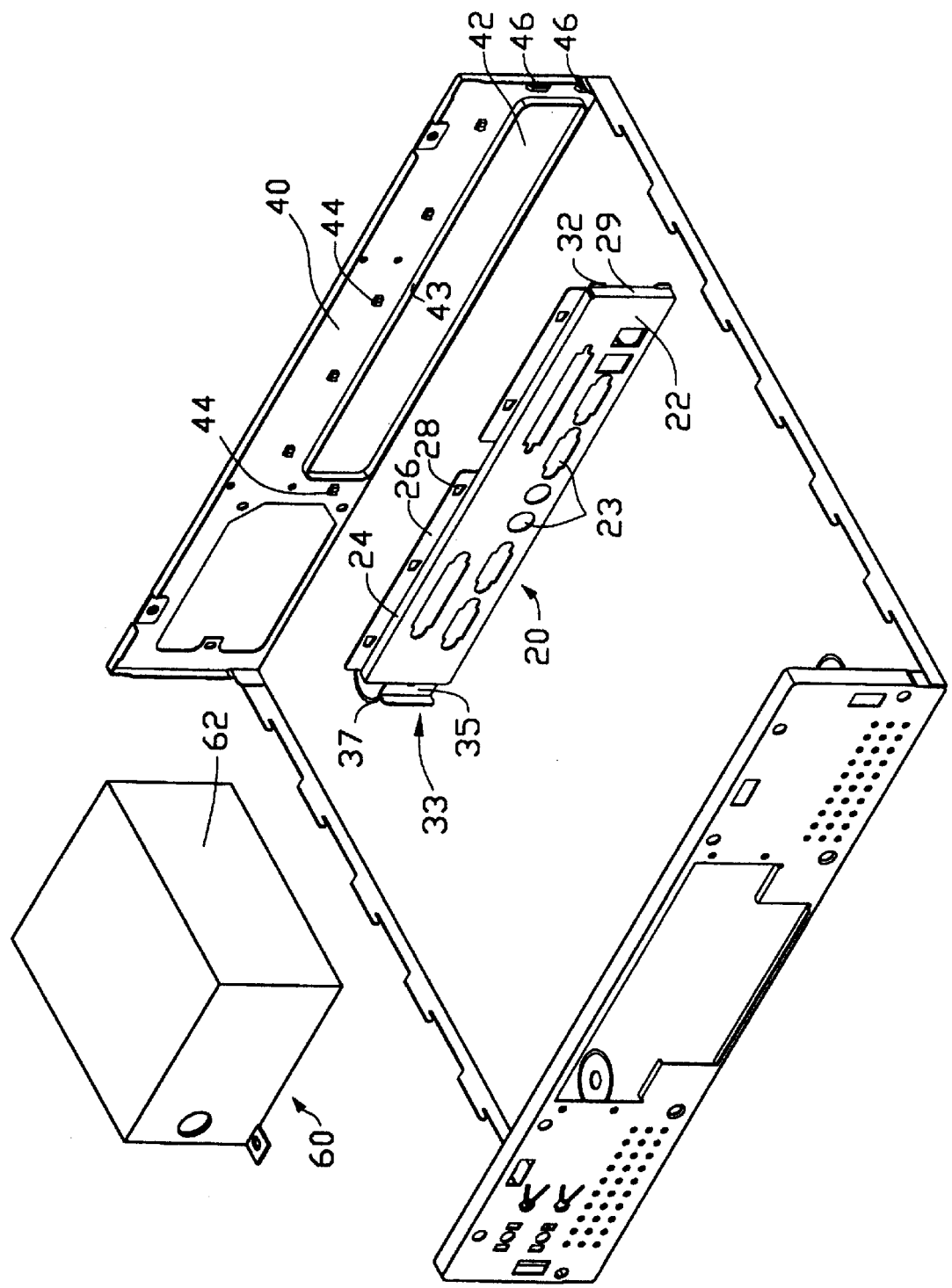
FIG. 2 is another perspective view of the computer enclosure and the I/O bracket of the present invention.

Referring to the drawings and in particular to FIGS. 1 and 2, a computer enclosure is shown. The computer enclosure has a back panel 40 in which an opening 42 is defined. An inward-projecting, perpendicular internal wall 43 is formed on the back panel 40 extending along a circumferential edge of the opening 42 to which an I/O bracket constructed in accordance with the present invention, designated with reference numeral 20, is releasably attached. A power supply 60 is fixed to the enclosure proximate the I/O bracket 20 for fixing the I/O bracket 20 in position. This will be further described.

The I/O bracket 20 comprises a plate 22 in which connector access openings 23 are defined for exposing connectors mounted on a circuit board (not shown) fixed in the enclosure. The I/O bracket 20 has a shape substantially corresponding to the opening 42 and a size slightly greater than the opening 42 for sealing the opening 42. In the embodiment illustrated, the opening 42 is rectangular and accordingly, the plate 22 is rectangular. However, it is apparent that the opening 42 may assume other shapes. The plate 22 that is rectangular in this case has four edges from which at least a primary top flange 24 and two primary side flanges 29, 31 extend. The primary flanges 24, 29, 31 are substantially normal to the plate 22 for fitting over the internal wall 43 of the back panel 40. In the embodiment illustrated, the plate 22 has a longitudinal dimension between the primary side flanges 29, 31 greater than that of the opening 42 thereby allowing the I/O bracket 20 to be movable with respect to the back panel 40.

Secondary top flanges 26 extend from the primary top flange 24 substantially parallel to the plate 22 whereby when the I/O bracket 20 is mounted to the back panel 40, the secondary top flanges 26 overlappingly and slidably engage the back panel 40. Although two secondary top flanges 26 are formed in the embodiment illustrated, it is apparent to those having ordinary skills to use one or more than two flanges in substitute thereto.

Figure 3:
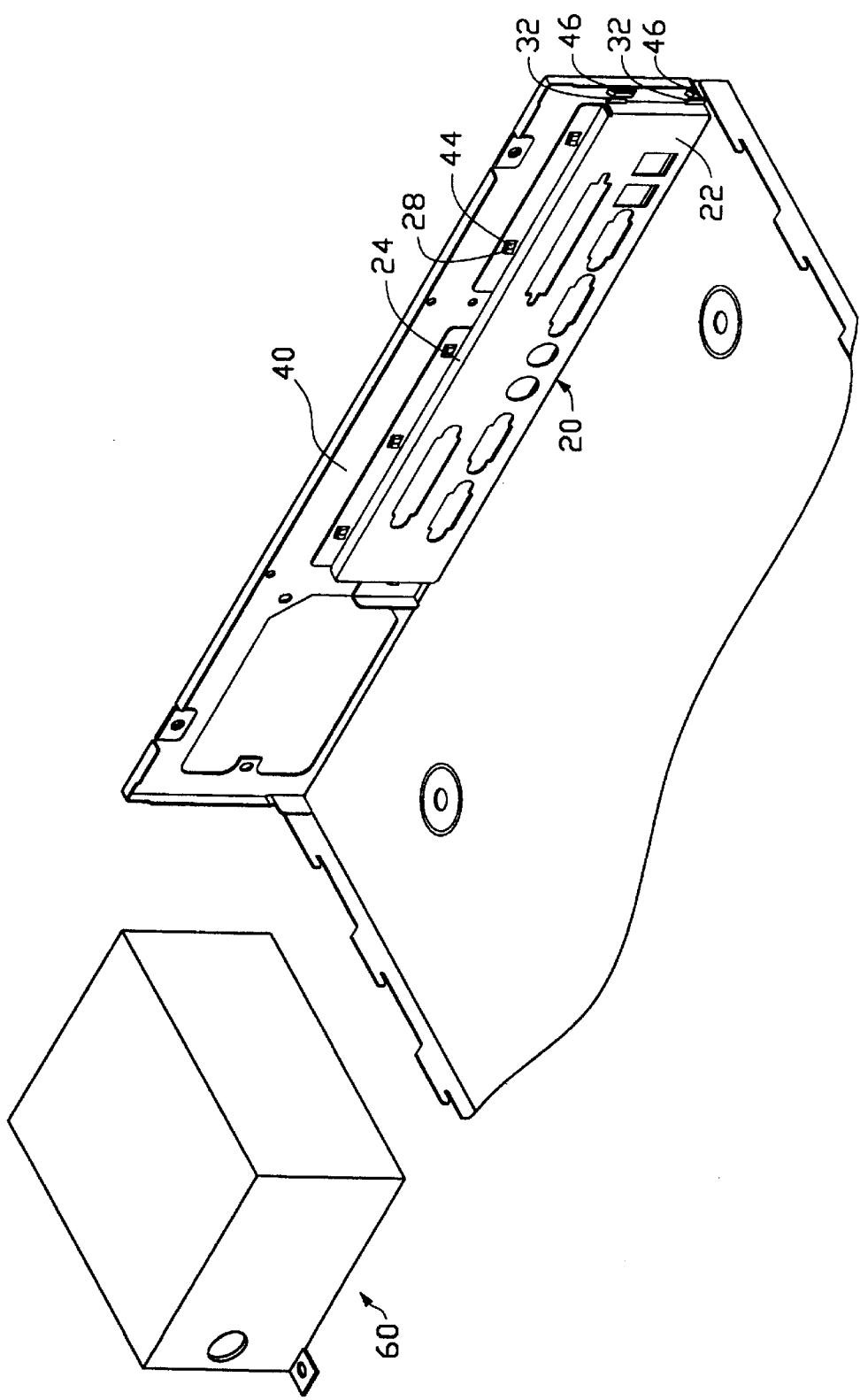
FIG. 3 is a perspective view of a portion of the computer enclosure illustrating an initial phase of mounting the I/O bracket thereto.
Figure 4:
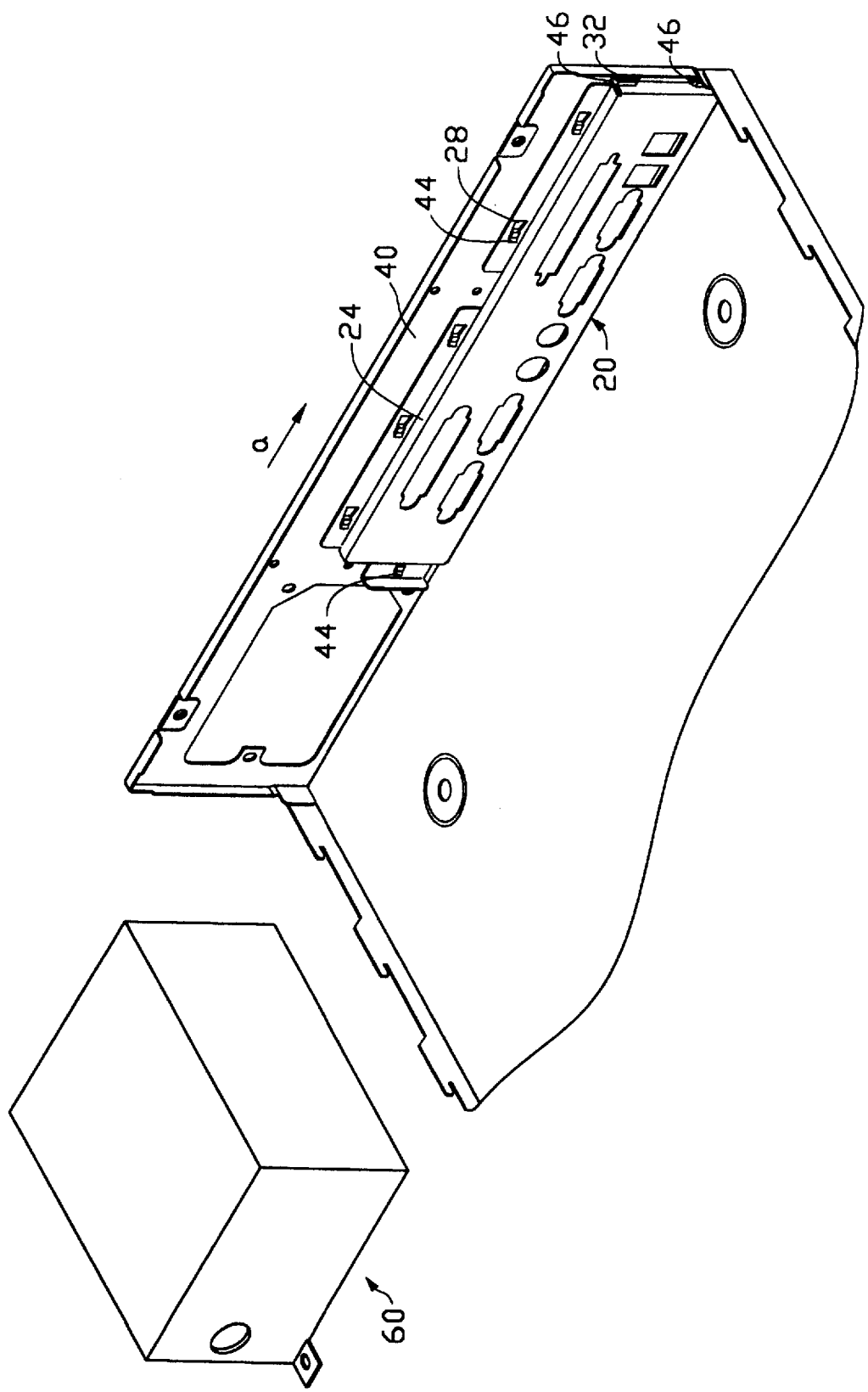
FIG. 4 is similar to FIG. 3 but illustrating a second phase of mounting the I/O bracket to the computer enclosure.

The secondary flanges 26 define a plurality of trapezoidal holes 28 having a large first end and a small second end. Corresponding to the trapezoidal holes 28 of the I/O bracket 20, L-shaped pawls 44 are formed on the back panel 40 and projecting inward. Preferably, the L-shaped pawls are formed by stamping the back panel 40. The pawls 44 have a size smaller than the first end of the corresponding trapezoidal hole 28 and larger than the second end thereof whereby at an initial phase for mounting the I/O bracket 20 to the back panel 40, the pawls 44 are received in the first ends of the corresponding holes 28 as shown in FIG. 3 (unlocked position). At a second phase, the I/O bracket 20 is moved with respect to the back panel 40 as indicated by arrow a of FIG. 4 causing the pawls 44 to move to and thus engage with the second ends of the corresponding holes 28 (locked position) thereby securing the I/O bracket 20 to the back panel 40 without using bolts.

Figure 5:
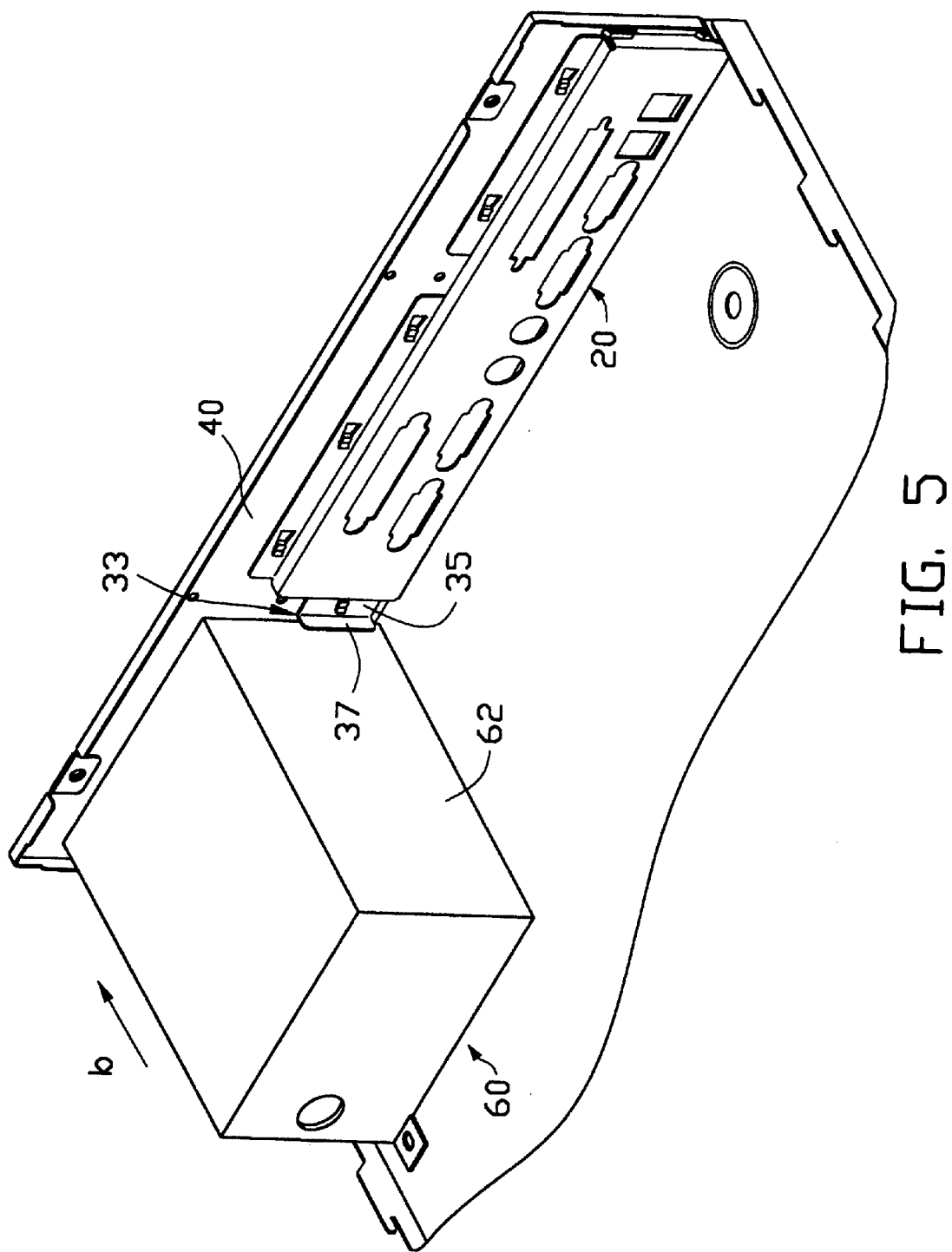
FIG. 5 is similar to FIGS. 3 and 4 but illustrating a final phase of mounting the I/O bracket to the computer enclosure.

Back to FIGS. 1 and 2, a fixing means 33 is formed on the primary side flange 31 for cooperating with an additional part of the enclosure, such as a power supply 60, to fix the I/O bracket 20 in the locked position. The fixing means 33 comprises a secondary side flange 35 extending from the primary side flange 31 in a direction substantially parallel to the plate 22 whereby when the I/O bracket 20 is mounted to the back panel 40, the secondary side flange 35 overlappingly and slidably engaging the back panel 40. A perpendicular extension 37 is formed on the free end of the secondary side flange 35 and is thus substantially parallel to the primary side flange 31. In a final phase of mounting the I/O bracket 20 to the back panel 40 of the enclosure, the power supply or other device 60 having a side wall 62 is mounted to the enclosure by being moved in a direction indicated by arrow b of FIG. 5 to a position where the side wall 62 substantially abuts against the extension 37 of the secondary side flange 35 thereby preventing the I/O bracket 20 from moving with respect to the back panel 40 and thus securely fixing the I/O bracket 20 to the back panel 40.

Preferably, a trapezoidal hole 28 is also formed in the secondary side flange 35 as most clearly shown in FIG. 1 which receives and then engages with a corresponding L-shaped pawl 44 in the initial and second phases of mounting the I/O bracket 20 to the back panel 40.

Tabs 32 are formed on and extend from a free end of the primary side flange 29 in a direction substantially parallel to the plate 22. Receiving slots 46 are formed on the back panel 40 whereby when the I/O bracket 20 is moved in the direction a from the initial phase to the second phase, the tabs 32 are moved into and thus engage with the slots 46 for attaching the I/O bracket 20 to the back panel 40. Preferably, each receiving slot 46 is formed by a raised portion stamped on the back panel 40.

Although the present invention has been described with reference to the preferred embodiment, it is apparent to those skilled in the art that a variety of modifications and changes may be made without departing from the scope of the present invention which is intended to be defined by the appended claims.

What is claimed is:

1. An I/O bracket adapted to be mounted to an opening defined in a back panel of an enclosure of electronic apparatus for exposing connectors of the electronic apparatus comprising a plate having a size substantially corresponding to and thus closing the opening of the back panel and an engaging section extending from an edge of plate for slidably engaging the back panel whereby the I/O bracket is movable with respect to the back panel from a first unlocked position to a second locked position, securing means comprising a plurality of holes defined in the engaging section, each hole having a wide section and a narrow section, projections having an enlarged free end having a dimension greater than a first width of the narrow section of the holes and smaller than a second width of the wide section of the holes whereby when the I/O bracket is at the first position, the projections are received in the wide sections of the holes and when the I/O bracket is moved to the second position, the enlarged free ends of the projections engage with the narrow sections of the holes thereby securing the I/O bracket to the back panel.

2. The I/O bracket as claimed in claim 1, wherein the plate has a first lateral edge having an extension formed thereon adapted to abut against a side wall of an additional part of the enclosure which is fixed to the enclosure after the I/O bracket is moved to the second position thereby preventing the I/O bracket from moving back to the first position.

3. The I/O bracket as claimed in claim 1, wherein the engaging section is L-shaped comprising a primary flange perpendicularly extending from the edge of the plate for slidably fitting over a perpendicular wall extending along the opening of the back panel and a secondary flange perpendicularly extending from the primary flange for slidably engaging the back panel, the hole being defined in the secondary flange for receiving and engaging with the projections of the back panel.

4. The I/O bracket a s claimed in claim 3, wherein the plate has first and second lateral edges opposite to each other, each having a primary flange perpendicularly extending therefrom for fitting over walls perpendicularly extending from and along opposite lateral edges of the opening of the back panel, the primary flanges of the first and second lateral edges of the plate being spaced from each other a first distance, the walls of the back panel being spaced a second distance smaller than the first distance thereby allowing the I/O bracket to be movable with respect to the back panel from the first position to the second position.

5. An enclosure of an electronic apparatus comprising:
a back panel defining an opening; and
an I/O bracket releasably and movably mounted to the back panel to substantially close the opening, the I/O bracket comprising a plate having a size substantially corresponding to and thus closing the opening of the back panel and an engaging section extending from an edge of plate for being slidably engaging with the back panel whereby the I/O bracket is movable with respect to the back panel from a first unlocked position to a second locked position, securing means comprising a plurality of holes defined in the engaging section, each hole having a wide section and a narrow section, projections having an enlarged free end having a dimension greater than a first width of the narrow section of the holes and smaller than a second width of the wide section of the holes whereby when the I/O bracket is at the first position, the projections are received in the wide sections of the holes and when the I/O bracket is moved to the second position, the enlarged free ends of the projections engage with the narrow sections of the holes thereby securing the I/O bracket to the back panel.

6. The enclosure as claimed in claim 5, wherein the holes are trapezoidal.

7. The enclosure as claimed in claim 5, wherein the projections are L-shaped.

8. The enclosure as claimed in claim 7, wherein the L-shaped projections are stamped on the back panel.

9. The enclosure as claimed in claim 5, wherein the plate has a first lateral edge having an extension formed thereon for abutting against a side wall of an additional part of the enclosure which is fixed to the enclosure after the I/O bracket is moved to the second position thereby preventing the I/O bracket from moving back to the first position.

10. The enclosure as claimed in claim 9, wherein the extension is substantially perpendicular to the first lateral edge for overlapping and abutting the side wall of the additional part.

11. The enclosure as claimed in claim 9, wherein the plate has an opposite second lateral edge from which tabs extend for engaging with slots defined in the back panel when the I/O bracket is moved toward the second position.

12. The enclosure as claimed in claim 5, wherein tabs extend from an edge of the plate for engaging with slots defined in the back panel when the I/O bracket is moved toward the second position.

13. The enclosure as claimed in claim 12, wherein the slots are formed by raised portions stamped on the back panel.

14. The enclosure as claimed in claim 5, wherein the engaging section is L-shaped comprising a primary flange perpendicularly extending from the edge of the plate for slidably fitting over a perpendicular wall extending along the opening of the back panel and a secondary flange perpendicularly extending from the primary flange for slidably engaging the back panel, the hole being defined in the secondary flange for receiving and engaging with the projections of the back panel.

15. The enclosure as claimed in claim 14, wherein the plate has first and second lateral edges opposite to each other, each having a primary flange perpendicularly extending therefrom for fitting over walls perpendicularly extending from and along opposite lateral edges of the opening of the back panel, the primary flanges of the first and second lateral edges of the plate being spaced from each other a first distance, the walls of the back panel being spaced a second distance smaller than the first distance thereby allowing the I/O bracket to be movable with respect to the back panel from the first position to the second position.

16. The enclosure as claimed in claim 15, wherein the holes are trapezoidal and the projections are L-shaped sized to be received in the wide ends of the trapezoidal holes and to engage the narrow ends of the trapezoidal holes when the I/O bracket is moved to the second position.

17. The enclosure as claimed in claim 15, wherein a secondary flange perpendicularly extends from the primary flange of the first lateral edge of the plate, a perpendicular extension formed on the secondary flange for overlappingly abutting against a side wall of an additional part of the enclosure which is fixed to the enclosure after the I/O bracket is moved to the second position thereby preventing the I/O bracket from moving back to the first position.

18. The enclosure as claimed in claim 17, wherein tabs perpendicularly extend from the second lateral edge of the plate for engaging with slots defined in the back panel when the I/O bracket is moved toward the second position.

19. The enclosure as claimed in claim 15, wherein tabs extend from the second lateral edge of the plate for engaging with slots defined in the back panel when the I/O bracket is moved toward the second position.

20. An electronic apparatus comprising:

an enclosure defining a back panel with an opening therein;

an I/O bracket releasably and moveably mounted to the back panel, said bracket being dimensioned to substantially occupy said opening when attached thereto;

means for assembling said bracket and said back panel together, said means including a plurality of projections formed on one of said bracket and said back panel and a plurality of holes formed in the other of said bracket and said back panel, said projections cooperating with said holes to allow the bracket to be attached to said back panel by slightly moving the bracket with regard to the back panel in a transverse direction of the back panel, thus restraining the bracket from moving relative to the back panel in both a vertical direction and a front-to-back direction of the enclosure; and an electronic part attached to the back panel and side by side disposed beside the bracket with means abutting against an edge section of said bracket for preventing movement of the bracket relative to the back panel along another transverse direction opposite to said transverse direction.

* * * * *